United States Patent Office 3,336,321
Patented Aug. 15, 1967

3,336,321
1-(SUBSTITUTED-BENZOYL) PIPECOLINIC ACID ESTER DERIVATIVES
Karl J. Doebel, Ossining, and Heinz A. Pfenninger, New City, N.Y., assignors to Geigy Chemical Corporation, Greenburgh, N.Y., a corporation of Delaware
No Drawing. Original application Apr. 15, 1964, Ser. No. 360,064, now Patent No. 3,300,482, dated Jan. 24, 1967. Divided and this application Nov. 4, 1966, Ser. No. 591,976
9 Claims. (Cl. 260—294.3)

This application is a divisional of copending application Serial No. 360,064, filed April 15, 1964, now U.S. Patent No. 3,300,482 issued January 24, 1967.

This invention relates to new and useful pyridobenzodiazepines and particularly to $N_{11}$-substituted pyridobenzodiazepine derivatives as well as the pharmaceutically acceptable acid addition salts thereof, which possess valuable pharmacological properties and are useful as pharmaceutical agents. The present invention pertains further to methods for producing such derivatives and to novel intermediates useful both in the preparation of such derivatives and as pharmaceutical agents per se.

In one aspect, the instant invention concerns, more particularly, 11-[ω - amino(lower)alkyl]-1,2,3,11,12,12a-hexahydro(4H,6H)pyrido[1,2 - c] - [1,4]benzodiazepines which can be represented by the following structural formula

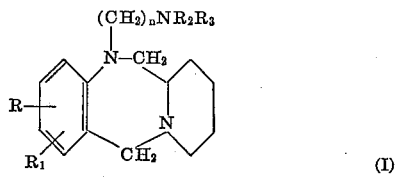

wherein R and $R_1$ each stand for hydrogen, halogen (particularly, chlorine, bromine and iodine), trifluoromethyl, cyano, lower alkyl or lower alkoxy or methylenedioxy when R and $R_1$ are taken together;

$R_2$ and $R_3$ each represents hydrogen or lower alkyl, or when $R_2$ and $R_3$ are taken together with the adjacent nitrogen atom, piperidino, morpholino, piperazino or N-methylpiperazino and n is 2 to 5.

The term "lower alkyl" as used herein per se and as included in the term "lower alkoxy" means saturated monovalent aliphatic radicals of the general formula —$C_mH_{2m+1}$ wherein m designates an integer of less than six and is inclusive of both straight-chain and branched-chain radicals, such as, methyl, ethyl, n-propyl, isopropyl, n-butyl, isobutyl, n-amyl, etc.

In another aspect, the present invention is directed to 11 - [ω - amino(lower)alkanoyl] - 1,2,3,11,12,12a - hexahydro(4H,6H)pyrido[1,2-c]-[1,4]benzodiazepines which can be represented by the following structural formula

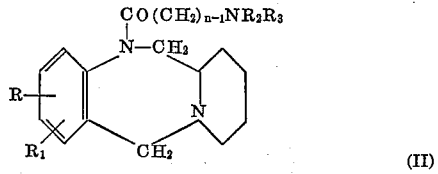

wherein all the symbols used have the significance ascribed to them hereinabove.

The present invention comprehends not only the above described pyridobenzodiazepine derivatives in their free base form, but it also includes pharmaceutically acceptable non-toxic acid addition salts thereof which can be formed from said derivatives in accordance with conventional practice, by using appropriate inorganic and organic acids, such as hydrohalic acids, especially hydrochloric and hydrobromic acids, sulfuric and phosphoric acids, etc. as well as acetic, lactic, succinic, malic, aconitic, phthalic and tartaric acids, etc.

As mentioned above, the subject compounds possess valuable pharmacological properties; they can be characterized as analgesic, hypotensive, tranquilizing, local anesthetic and/or anti-inflammatory agents on the basis of pharmacological tests with animals.

Merely by way of illustration, 9-chloro-11-(3-piperidinopropionyl) - 1,2,3,11,12,12a-hexahydro(4H,6H)pyrido[1,2-c]-[1,4]benzodiazepine has, for example, been demonstrated to be an active analgesic in the acetic acid stretch test, the Haffner test and the grid shock test, with no significant cardiovascular effect. Its $LD_{50}$ is between 500 and 1250 mg./kg. p.o. in mice. Its analgesic dose is between 15 and 25 mg./kg. in mice. It also has a local anesthetic effect about equal to lidocaine.

Compounds of Formula I are produced by reducing compounds of Formula II, dissolved in an appropriate inert organic solvent, such as ether, tetrahydrofuran, etc. in the presence of metal hydrides as reducing agents such as lithium aluminum hydride, etc., and under reflux.

Alternative processes for preparing compounds of Formula I are as follows:

(a) Alkylation of compounds of Formula IV with appropriate polymethylenedihalides, such as, bromopropylchloride, bromobutylchloride, etc. and subsequent reaction of the intermediate $N_{11}$-ω-haloalkyl derivatives of compounds of Formula IV with amines of the formula

wherein $R_2$ and $R_3$ have the meanings given above.

(b) Reaction of compounds of Formula IV with ω-halogenated Δ'-(lower)alkenes, such as, alkylchloride, alkylbromide, 4-bromo-1-butene, etc. and reaction of the obtained $N_{11}$-alkenylated derivatives of comopunds of Formula IV with amines of the formula

wherein $R_2$ and $R_3$ have the meanings given above, under strongly alkaline conditions of either atmospheric or elevated pressures and temperatures between 25° C.–150° C.

(c) Reaction of compounds of Formula IV with 1,2-epoxido(lower)alkylhalides, such as, epichlorohydrin, etc. and conversion of the obtained $N_{11}$-epoxido(lower)alkyl derivatives of compounds of Formula IV to the corresponding $N_{11}$-ω-hydroxy(lower)alkyl derivatives. The latter are then reacted with halogenated agents, such as, phosphorus tribromide, etc. and the $N_{11}$-ω-halo(lower)alkyl derivatives of compounds of Formula IV, which are obtained, are reacted with amines of formula

wherein $R_2$ and $R_3$ have the meanings given above.

Compounds of Formula II, are prepared by reacting 11 - [ω - halo(lower)alkanoyl] - 1,2,3,11,12,12a - hexahydro - (4H,6H)pyrido[1,2 - c] - [1,4]benzodiazepine of the formula

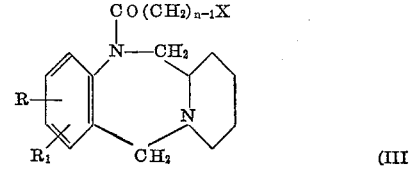

wherein R, $R_1$ and $n$ have the meanings given above and X is halogen (particularly, chlorine and bromine) dissolved in an appropriate inert organic solvent, such as, toluene, benzene, xylene, etc., with the desired primary or secondary amine.

Intermediates of Formula III, in turn, are produced from 1,2,3,11,12,12a - hexahydro(4H,6H)pyrido[1,2 - c]-[1,4]-benzodiazepines of the formula

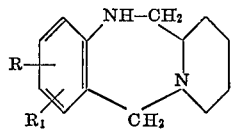
(IV)

wherein R and $R_1$ are as defined hereinabove, by reacting compounds of Formula IV, dissolved in an appropriate inert organic solvent, such as, benzene, etc. with an ω-halo-lower)alkanoyl halide, particularly those containing chlorine or bromine.

Compounds of Formula IV can be prepared by reduction with metal hydride reducing agents, such as, lithium aluminum hydride, etc., of (1) 1,2,3,11,12,12a-hexahydro(4H,6H)pyrido[1,2-c]-[1,4]benzodiazepine-12-ones of the formula

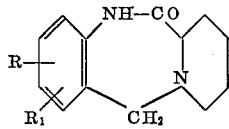
(V)

wherein R and $R_1$ have the above-mentioned significance, which in turn are produced by reacting lower alkylpipecolinates and o-nitrobenzylhalides, reducing the o-nitrobenzylpipecolinates obtained to the corresponding o-aminobenzylpipecolinates and simultaneously saponifying and condensing the latter to yield compounds of Formula V, or (2) 1,2,3,11,12,12a-hexahydro(4H,6H)pyrido[1,2-c]-[1,4]benzodiazepine-6,12-diones of the formula

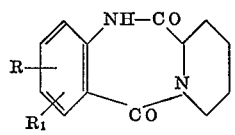
(VI)

wherein R and $R_1$ are as defined above, which in turn are produced by reacting lower alkylpipecolinates and o-nitrobenzoyl halides, reducing the o-nitrobenzoylpipecolinates obtained to the corresponding o-aminobenzoylpipecolinates and saponifying and condensing the o-aminobenzoylpipecolinic acids to give compounds of Formula VI.

The over-all synthesis of the novel compounds of this invention can be illustrated graphically by the following diagrammatic representation:

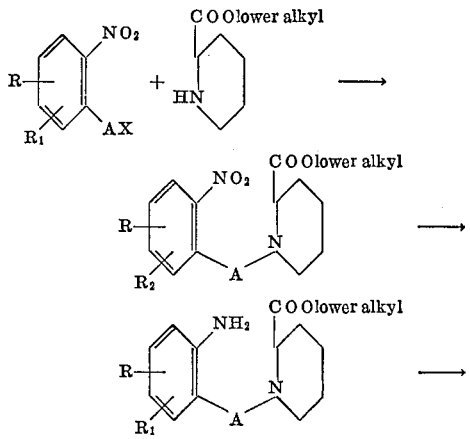

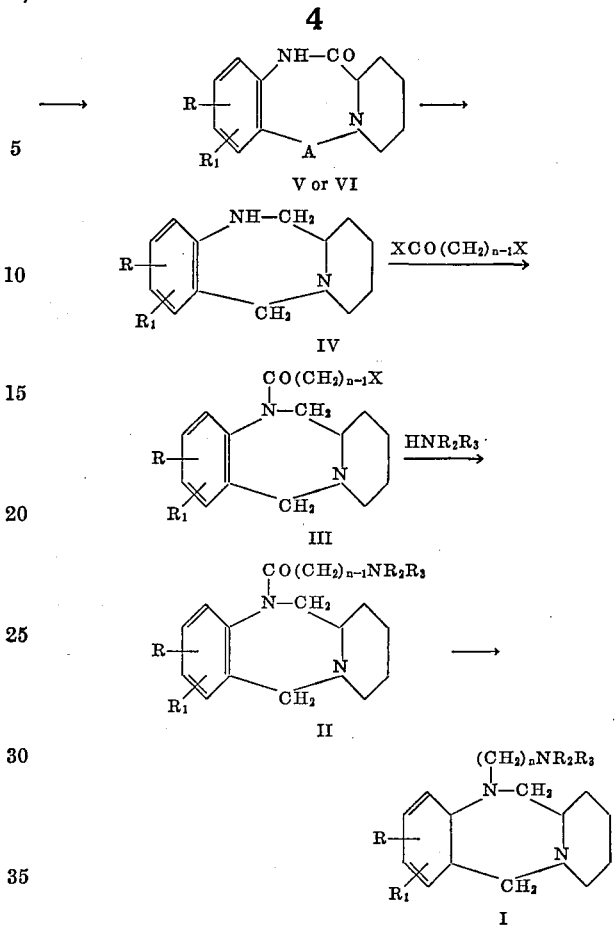

wherein R, $R_1$, $R_2$, $R_3$, X and $n$ have the meanings ascribed to them above and A represents —CO— or —CH$_2$—.

Compounds of Formula VI can alternatively be produced by reacting hydrohalides of optionally substituted o-aminobenzoyl halides (which in turn can be easily prepared from optionally substituted anthanilic acids with halogenating agents, such as, thionylchloride, phosphorous oxychloride, etc. in inert organic solvents, such as, benzene, toluene, etc.) with alkyl pipecolinates or pipecolinic acid in the presence of bases like triethylamine, dimethylaniline, potassium carbonate, etc. and in inert organic solvents, such as, benzene, toluene, xylene, etc.

As mentioned above, the compounds of Formulae IV, V and VI are useful also independently as pharmaceutical agents. Thus, for example of compounds of Formula IV possess analgesic, hypotensive-antihypertensive and/or antihistaminic properties; the compounds of Formula V exhibit CNS depressant, anti-convulsant, muscle relaxant and hypertensive effects; and compounds of Formula VI show hypotensive-antihypertensive, diuretic and/or analgasic activities.

The pharmaceutically acceptable nontoxic acid addition salts of compounds of the Formulae IV and V which may be formed from the free bases in accordance with conventional practice by using the organic and inorganic acids mentioned hereinabove are also encompassed by the scope of the present invention as well as the quaternary ammonium salts obtained by addition to the free bases of alkyl or aralkyl esters of inorganic acids or organic sulfonic acids, mentioned hereinabove, and the N-oxides made therefrom by subjecting the free bases to a large excess of hydrogen peroxide in a lower alkanol, are also within the purview of the present invention.

The compounds of this invention and their acid addition salts as well as the various intermediates therefor, together with the over-all synthesis as well as the preparative steps, are more fully illustrated in experimental detail by the following examples. The scope of the invention is, however, not limited thereto. The temperatures therein given are in degrees centigrade.

In these examples, the following nomenclature is used:

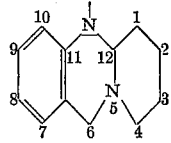

11-substituted-1,2,3,11,12,12a-hexahydro(4H,6H)pyrido-[1,2-c]-[1,4]benzodiazepine.

EXAMPLES (I) 1,2,3,11,12,12a-HEXAHYDRO(4H,6H) PYRIDO[1,2-c]-[1,4]-BENZODIAZEPINE-12-ONES

EXAMPLE 1

*1,2,3,11,12,12a-hexahydro(4H,6H)pyrido-[1,2-c]-[1,4]benzodiazepine-12-one*

(a) *Ethyl pipecolinate.*—200 g. of pipecolinic acid was dissolved in 1625 ml. of 5 N hydrochloric acid. 8 g. of $PtO_2$ was added and the mixture was transferred to a 5 l. pressure flask and heated to 70°. This temperature was maintained and electronically controlled during the whole operation. The solution was shaken with hydrogen at a pressure of 5 atm. The total uptake was 340 p.s.i. (3 hours). The flask was cooled to room-temperature, hydrogen was replaced by nitrogen and the catalyst removed by filtration. Completeness of hydrogenation was controlled by U.V. Measurements. The solution was then concentrated to dryness in vacuo and the crystalline pipecolinic acid hydrochloride dried by azeotropic distillation of benzene. 265 g. of pipecolinic acid hydrochloride were obtained; M.P. 265–266°. 100 g. of pipecolinic acid hydrochloride was dissolved in 1050 ml. of dry ethanol and 25 ml. of chlorosulfonic acid was added dropwise. The mixture was refluxed for 24 hours and the solvent removed in vacuo. The residue was dissolved in a small amount of water and the solution made alkaline with saturated potassium carbonate solution at 0°. The alkaline solution was saturated with sodium chloride and exhaustively extracted with benzene and ether. The combined extracts were dried over sodium sulfate, filtered and the solvent removed in vacuo. The residue was distilled to yield 80.0 g. of the desired intermediate; B.P. 93–95°/14 mm.; $n_D^{24}$=1.4550. Only end-absorption in the U.V. spectrum was observed.

(b) *Ethyl N-(o-nitrobenzyl)pipecolinate.*—31.4 g. of ethyl pipecolinate was dissolved in 200 ml. of dry toluene. 32.0 g. of potassium carbonate was added and a solution of 34.3 g. of o-nitrobenzylchloride in 150 ml. of dry toluene was slowly dropped in while stirring. After the addition was complete, the mixture was refluxed for 12 hours. After cooling it was transferred to a beaker and an excess of 3 N hydrochloric acid was added. When the potassium carbonate was decomposed both phases were transferred to a separatory funnel and the toluene phase was extracted with 3 N hydrochloric acid. The combined extracts were washed with ethyl acetate and alkalized with sodium hydroxide to pH 10. The precipitated oily material was taken up in chloroform and the latter washed with water, dried over sodium sulfate and the solvent removed in vacuo. The residue was distilled to give 43 g. of the desired intermediate as a yellow oil; B.P. 150–152°/0.35 mm.; $n_D^{23}$=1.5266.

*Analysis* (for $C_{15}H_{20}N_2O_4$ (MW 292.35)).—Calc'd: C 61.65, H 6.89, N 9.57. Found: C 61.75, H 7.08, N 9.33.

(c) *Ethyl N-(o-aminobenzyl)pipecolinate.*—33.0 g. of ethyl N-(o-nitrobenzyl)pipecolinate was dissolved in 500 ml. of ethanol and hydrogenated over Raney nickel at room temperature and atmospheric pressure. Uptake of hydrogen was 2350 ml. The catalyst was removed by filtration and the solvent removed in vacuo. The residue was distilled to yield 24.7 g. of the desired intermediate; B.P. 146–147°/0.5 mm.; $n_D^{23}$=1.5392.

(d) *Desired compound.*—24 g. of ethyl N-(o-aminobenzyl)pipecolinate was dissolved in 300 ml. of 3 N hydrochloric acid and refluxed for 5 hours. The resulting yellow solution was cooled, filtered and alkalized to a pH of 10. The crystalline precipitate was collected on a Buchner funnel, washed with water and recrystallized from 2B-ethanol. Yield of the desired compound was 70%; M.P. 182–183°.

*Analysis* (for $C_{13}H_{16}N_2O$ (MW 216.29)).—Calc'd: C 72.2, H 7.46, N 12.92. Found: C 72.13, H 7.66, N 12.83.

The hydrochloride was obtained in crystalline form by treating the free base with excess ethanolic hydrochloric acid, removing the solvent in vacuo and recrystallizing the residue from ether/ethanol or 5 N hydrochloric acid. It melted about 250°.

EXAMPLE 2

*8-chloro-1,2,3,11,12,12a-hexahydro(4H,6H)-pyrido[1,2-c]-[1,4]benzodiazepine-12-one*

(a) *Ethyl N - (2 - nitro-5-chlorobenzyl)pipecolinate.*—33.3 g. of ethyl pipecolinate was dissolved in 200 ml. of dry toluene, 34 g. of potassium carbonate was added and a solution of 44.54 g. of 2-nitro-5-chlorobenzylchloride [synthesized via the procedure described by Eichengrün and Einhorn, A. 262, 133 (1891) and Fieser and Berliner, JACS 74, 536 (1952)] in 300 ml. of dry toluene dropped in while stirring. After the addition was complete the mixture was refluxed for 12 hours. After cooling the mixture was acidified and exhaustively extracted with 3 N hydrochloric acid. The combined acid extracts were washed with ethyl acetate and then made strongly alkaline. The precipitated oil was extracted with ether, the latter washed with water, dried over sodium sulfate and removed in vacuo. The residue was distilled in vacuo to yield 45.8 g. (66% theory) of the desired intermediate as a yellow viscous oil; B.P. 153–154°/0.1 mm.

*Analysis* (for $C_{15}H_{19}ClN_2O_4$ (MW 326.79)).—Calc'd: C 55.20, H 5.86, Cl 10.84, N 8.58. Found: C 55.20, H 6.00, Cl 11.03, N 8.59.

(b) *Ethyl N - (2-amino-5-chlorobenzyl)pipecolinate.*—7.5 g. of ethyl N-(2-nitro-5-chlorobenzyl)pipecolinate was dissolved in 100 ml. of ethanol and hydrogenated at room temperature and atmospheric pressure over Raney nickel. Uptake of hydrogen was 1670 ml. The catalyst was then removed by filtration and the filtrate evaporated to dryness in vacuo. The residual oil was distilled to yield 5.1 g. of the desired intermediate as oil; B.P. 154°/0.3 mm.

*Analysis* (for $C_{15}H_{21}ClN_2O_2$ (MW 296.80)).—Calc'd: C 60.80, H 7.12, Cl 11.93, N 9.45. Found: C 60.53, H 7.27, Cl 11.89, N 9.62.

(c) *Desired compound.*—20.0 g. of ethyl N-(2-amino-5-chlorobenzyl)pipecolinate was refluxed with 350 ml. of 3 N hydrochloric acid for 5 hours. After cooling the solution was alkalized to pH 10 and then extracted exhaustively with chloroform. The combined chloroform extracts were washed with water, dried over sodium sulfate and the solvent removed in vacuo. The residue weighed 16.32 g. and was a white crystalline solid. It could be easily recrystallized from 2B ethanol. Yield of the desired compound was 14 g.; M.P. 224–225°.

*Analysis* (for $C_{13}H_{15}ClN_2O$ (MW 250.72)).—Calc'd: C, 62.35; H, 6.03; Cl, 14.13; N, 11.17. Found: C, 62.08; H, 6.29; Cl, 14.30; N, 11.21.

The following compounds were made by way of an analogous procedure:

Ex. 3—9-cyano-1,2,3,11,12,12a-hexahydro(4H,6H)pyrido-[1,2-c]-[1,4]benzodiazepine-12-one; M.P. 134°.

Ex. 4—9-methoxy-1,2,3,11,12,12a-hexahydro(4H,6H)pyrido-[1,2-c]-[1,4]benzodiazepine-12-one; M.P. 205–207°.

Ex. 5—9-methyl-1,2,3,11,12,12a-hexahydro(4H,6H)pyrido-[1,2-c]-[1,4]benzodiazepine-12-one; M.P. 231–232°.

Ex. 6—9-trifluoromethyl-1,2,3,11,12,12a-hexahydro-(4H,6H)-pyrido[1,2-c]-[1,4]benzodiazepine-12-one; M.P. 185–186°.

Ex. 7—9-chloro-1,2,3,11,12,12a-hexahydro(4H,6H)pyrido-[1,2-c]-[1,4]benzodiazepine-12-one; M.P. 182–183°.

EXAMPLE 8

*8,9-dimethoxy-1,2,3,11,12,12a-hexahydro(4H,6H)-pyrido[1,2-c]-[1,4]benzodiazepine-12-one*

(a) *6-Nitroveratryl alcohol.*—To a solution of 21.1 g. of 6-nitroveratraldehyde (Org. Synth. 33, 65) in 150 ml. of benzene was added at room temperature with stirring a solution of 3.36 g. of t-butylamine borane in 300 ml. of benzene. The obtained mixture was refluxed for one-half hour, then cooled to room temperature and stirred for one-half hour, with 75 ml. of 2 N sulfuric acid. The solid precipitate was then filtered off. The benzene layer separated from the filtrate, dried over sodium sulfate and taken to dryness and the so obtained residue combined with the already filtered off precipitate. Yield (crude): 16 g. (75%). The desired product was recrystallized twice from ethanol; M.P. 145–146°.

(b) *6-Nitroveratryl chloride.*—10.65 g. of 6-nitroveratryl alcohol was dissolved in 300 ml. of chloroform and 15 g. of phosphorous pentachloride was added with stirring at room temperature. The reaction mixture was allowed to stand overnight at room temperature, then it was washed with water, sodium bicarbonate solution and the chloroform solution was dried over sodium sulfate and taken to dryness. The remaining oil crystallized and was recrystallized from ethanol. Yield: 10.5 g. (91%); M.P. 90–91°.

(c) *Ethyl N-(3,4-dimethoxy-6-nitrobenzyl)pipecolinate.*—To a mixture of 8.3 g. of ethyl pipecolinate and 36 g. of anhydrous potassium carbonate in 300 ml. of anhydrous toluene was added dropwise with stirring at the refluxing temperature a solution of 12.7 g. of 6-nitroveratryl chloride in 200 ml. of toluene. The obtained reaction mixture was refluxed for 8 hours with continuous stirring. After cooling to room temperature, the inorganic precipitate was filtered off and washed with ethyl acetate. The combined organic filtrates were extracted with 2 N hydrochloric acid, the aqueous extract was washed with ethyl acetate, made alkaline with solid potassium carbonate at 0° and extracted with ethyl acetate. The organic extracts were dried over sodium sulfate and taken to dryness. The residual oil crystallized on scratching and was recrystallized from ethanol-water. Yield: 5.8 g. (46%); M.P. 68–69°.

(d) *Ethyl N-(3,4-dimethoxy-6-aminobenzyl)pipecolinate.*—17.7 g. of ethyl N-(3,4-dimethoxy-6-nitrobenzyl)-pipecolinate was dissolved in 500 ml. of ethanol and hydrogenated with Raney nickel at room temperature and atmospheric hydrogen pressure until the hydrogen uptake stopped. The reaction mixture was filtered and taken to dryness and the remaining oil used directly for the next step. Yield: 16.25 g. (99.5%).

(e) *Desired compound.*—16.25 g. of ethyl N-(3,4-dimethoxy-6-aminobenzyl)-pipecolinate was refluxed with a mixture of 170 ml. of 5 N sodium hydroxide and 170 ml. of ethanol for 16 hours. The ethanol was then evaporated under reduced pressure, the residue diluted with water until a clean solution resulted and then made acidic with dilute sulfuric acid (1:1). The obtained solution was allowed to stand at room temperature for 24 hours, then it was treated with charcoal, filtered, made alkaline with solid potassium carbonate and extracted thoroughly with methylene chloride. The combined organic extracts were dried over sodium sulfate and taken to dryness. The yield of crude material was 3 g. (21.6%). It was recrystallized twice from ethanol; M.P. 203–204°.

*Analysis* (for $C_{15}H_{10}N_2O_3$ (NW 276.33)).—Calc'd: C, 65.19; H, 7:30; N, 10.14. Found: C, 65.47; H, 7.34; N, 10.20.

The following compounds were made by way of an analogous procedure:

Ex. 9—8,9 - dimethyl-1,2,3,11,12,12a-hexahydro(4H,6H)-pyrido[1,2-c]-[1,4]benzodiazepine-12-one; M.P. 229–230°.

Ex. 10—8,9-dichloro-1,2,3,11,12,12a-hexahydro(4H,6H)-pyrido[1,2-c]-[1,4]benzodiazepine-12-one; M.P. 199–200°.

Ex. 11—8,9 - methylenedioxy-1,2,3,11,12,12a-hexahydro-(4H,6H)pyrido[1,2-c]-[1,4]benzodiazepine - 12 - one; 265–266°. (dec.).

(II) *1,2,3,11,12,12a-hexahydro(4H,6H)pyrido [1,2-c]-[1,4]-benzodiazepine-6,12-diones*

EXAMPLE 12

*8-methyl-1,2,3,11,12,12a-hexahydro(4H,6H)pyrido-[1,2-c]-[1,4]benzodiazepine-6,12-dione*

(a) *Ethyl N-(5-methyl-2-nitrobenzoyl)pipecolinate.*—8.5 g. (0.05 mole) of 5-methyl-2-nitrobenzoic acid was dissolved in 300 ml. of benzene. To the resulting solution was added 9 g. of thionyl chloride in 50 ml. of benzene. The mixture was refluxed for 8 hours and concentrated to a syrupy residue in vacuo. The residue was taken up in 100 ml. of benzene and again concentrated to a syrup. It was dissolved in 200 ml. of dry toluene and 15.7 g. of ethyl pipecolinate in 100 ml. of toluene added at room temperature. The mixture was refluxed for 6 hours. The reaction mixture was cooled and filtered. The toluene filtrate was washed with water and dried over sodium sulfate and the solvent removed in vacuo. The residue was distilled to give 10 g. of a yellow oil; b.p. 190–191°/0.05 mm.

*Analysis* (for $C_{16}H_{20}N_2O_5$ (MW 320.34)).—Calc'd: C 59.97, H 6.27, N 8.64. Found: C 60.08, H 6.28, N 8.80.

(b) *Desired compound.*—10 g. of ethyl N-(5-methyl-2-nitrobenzoyl)pipecolinate was dissolved in 175 ml. of alcohol and hydrogenated at room temperature at atmospheric pressure over Raney nickel. The catalyst was removed by filtration and the filtrate concentrated in vacuo. The residue was distilled to give 6 g. of a yellow oil, B.P. 215–217°/0.2 mm. (with slight decomposition). The oil was suspended in 100 ml. of 3 N hydrochloric acid and allowed to stand for 2 days. The solution was alkalized with sodium hydroxide solution, extracted with chloroform, dried over sodium sulfate and concentrated to dryness. Yield: 3 g. After recrystallization from isopropanol, the desired material melted at 242–243°.

*Analysis* (for $C_{14}H_{16}N_2O_2$ (MW 244.29)).—Calc'd: C 68.83, H 6.60, N 11.46. Found: C 68.80, H 6.71, N 11.42.

EXAMPLE 13

*9-chloro-1,2,3,11,12,12a-hexahydro(4H,6H)pyrido-[1,2-c]-[1,4]benzodiazepine-6,12-dione*

(a) *4-chloro-2-nitrobenzoic acid.*—4-chloro - 2 - nitrobenzoic acid was prepared according to the procedure of F. Leonard et al., J. Org. Chem. II 405 (1946).

(b) *Ethyl N-(4-chloro-2-nitrobenzoyl)pipecolinate.*—Ethyl N-(4-chloro-2-nitrobenzoyl)pipecolinate was prepared according ot the procedure described in Example 12(a). The material melted at 72–73°.

*Analysis* (for $C_{15}H_{17}ClN_2O_5$ (MW 340.76).—Calc'd: C 52.86, H 5.03, N 8.22. Found: C 52.56, H 4.97, N 8.07.

(c) *Ethyl N-(4-chloro-2-aminobenzoyl)pipecolinate.*—18.1 g. of ethyl N-(4-chloro-2-nitrobenzoylpipecolinate was dissolved in 500 ml. of ethanol and hydrogenated at room temperature at atmospheric pressure over Raney nickel. The catalyst was removed by filtration and the filtrate concentrated in vacuo, thus inducing crystallization. The crystalline material was collected and recrystallized from isopropanol to yield 11 g., M.P. 142–143°.

*Analysis* (for $C_{15}H_{19}ClN_2O_3$).—Calc'd C 57.98, H 6.16, N 9.02. Found: C 57.91, H 6.16, N 8.85.

(d) *Desired compound.*—11 g. of ethyl-(4-chloro-2-aminobenzoyl)pipecolinate was suspended in a mixture of 100 ml. of 3 N sodium hydroxide and 50 ml. of alcohol. The mixture was warmed on the steam bath for 8 minutes. The alcohol was concentrated in vacuo and to the residue was added 300 ml. of 3 N hydrochloric acid. The mixture was allowed to stand overnight. The solution was alkalized with sodium carbonate solution and extracted with chloroform and dried over sodium sulfate. The chloroform solution was concentrated in vacuo. The residue crystallized. After recrystallization from methanol the material melted at 315–316°.

Analysis (for $C_{13}H_{13}ClN_2O_2$ (MW 264.71)).—Calc'd: C 58.98, H 4.95, N 10.59. Found: C 59.18, H 5.10, N 10.63.

EXAMPLE 14

*10-methoxy-1,2,3,11,12,12a-hexahydro(4H,6H)pyrido [1,2-c]-[1,4]benzodiazepine-6,12-dione*

(a) *3-methoxy-2-nitrobenzoyl chloride.*—The mixture of 20 g. of 3-methoxy-2-nitrobenzoic acid and 100 ml. of thionyl chloride was refluxed for 1 hour, then the excess thionyl chloride was stripped off under reduced pressure and the residue recrystallized from benzene-hexane. Yield: 17 g. (77.5%); M.P. 83–85°.

(b) *Ethyl N-(3-methoxy-2-nitrobenzoylpipecolinate.*— To a solution of 7.5 g. of ethyl pipecolinate, 5 ml. of triethylamine in 50 ml. of chloroform was slowly added with stirring at room temperature, a solution of 10.7 g. of 3-methoxy-2-nitrobenzoyl chloride. The reaction was strongly exothermic. The solution obtained was stirred for one-half hour at room temperature, then washed with 2 N hydrochloric acid and water, dried over sodium sulfate and taken to dryness. Yield: 17.2 g. of a very viscous clear oil. This material was directly used for the next step without further purification.

(c) *Ethyl N-(2-amino-3-methoxybenzoyl)pipecolinate.*—17.2 g. of ethyl N-(3-methoxy-2-nitrobenzoyl) pipecolinate was dissolved in 200 ml. of ethanol, 1.7 g. of 5% palladium on carbon catalyst was added and the mixture hydrogenated at atmospheric pressure until the hydrogen uptake stopped. The reaction mixture was then filtered and taken to dryness and the remaining green, very viscous oil directly used for the next step.

(d) *Desired compound.*—The crude ethyl N-(2-amino-3-methoxybenzoyl)pipecolinate was heated to the boiling point with 200 ml. of 2 N sulfuric acid until a solid precipitate began to form. The reaction mixture was allowed to cool to 5° and the crystalline precipitate was then filtered off and recrystallized from ethanol; M.P. of 229–230°. Yield: 5 g. (38.8%) based on 3-methoxy-2-nitrobenzoyl chloride.

Analysis (for $C_{14}H_{16}N_2O_3$ (MW 260.28)).—Calc'd: C 64.60, H 6.20, N 10.76. Found: C 64.53, H 6.01, N 10.92.

EXAMPLE 15

*8,10-dichloro-1,2,3,11,12,12a-hexahydro(4H,6H)pyrido [1,2-c]-[1,4]benzodiazepine-6,12-dione*

(a) *Ethyl N-(3,5-dichloro-2-aminobenzoyl)pipecolinate.*—10.3 g. (0.05 mole) of 3,5-dichloroanthranilic acid was dissolved in 600 ml. of benzene. To the resulting solution was added 15 ml. of thionyl chloride. The mixture was refluxed for 6 hours and concentrated to a syrupy residue in vacuo. The residue was taken up in 100 ml. of benzene and again concentrated to a syrup. It was dissolved in 300 ml. of toluene and added to a mixture of 0.05 mole of ethyl pipecolinate and 0.1 mole of triethylamine in 100 cc. of toluene at room temperature. The mixture was refluxed for 6 hours. It was then cooled and filtered. The toluene filtrate was washed with water and dried over sodium sulfate and the solvent was removed in vacuo. The residual oil crystallized on cooling. After recrystallization from isopropanol, the material melted at 111–112°. Yield: 8 g.

Analysis (for $C_{15}H_{18}Cl_2N_2O_3$ (MW 345.22)).—Calc'd: C, 52.20; H, 5.25; N, 8.12. Found: C, 52.33; H, 5.07; N, 7.40.

(b) *Desired compound.*—8 g. of ethyl N-(3,5-dichloro-2-aminobenzoyl)pipecolinate was suspended in 80 ml. of 3 N sodium hydroxide and 80 ml. of ethanol. The mixture was warmed on the steam bath for 5 minutes. The alcohol was removed in vacuo and to the residue was added 3 N hydrochloric acid until the solution was strongly acidic. The mixture was allowed to stand for 3 hours. The crystalline compound was filtered and washed with water. After recrystallization from ethanol the material melted at 199–200°. Yield: 3.5 g.

Analysis (for $C_{13}H_{12}Cl_2N_2O_2$ (MW 299.16)).—Calc'd: C, 52.18; H, 4.04; N, 9.37. Found: C, 52.39; H, 4.10; N, 9.32.

EXAMPLE 16

*8,9-dimethoxy-1,2,3,11,12,12a-hexahydro(4H,6H)-pyrido[1,2-c]-[1,4]benzodiazepine-6,12-dione*

(a) *Ethyl N - (4,5-dimethoxy - 2 - nitrobenzoyl)pipecolinate.*—4,5-dimethoxy-2-nitrobenzoic acid was prepared by oxidation of 4,5-dimethoxy-2-nitrobenzaldehyde. 11.3 g. (0.05 mole) of 4,5-dimethoxy-2-nitrobenzoic acid was dissolved in 250 ml. of benzene. To the resulting solution was added 0.1 mole of thionyl chloride. The mixture was refluxed for 6 hours and concentrated to a syrupy residue in vacuo. The residue was taken up in 100 ml. of benzene and again concentrated to a syrup. It was dissolved in 300 ml. of toluene and added to a mixture of 0.05 mole of triethylamine and 0.05 mole of ethyl pipecolinate in 100 ml. of toluene at room temperature. The mixture was warmed for 6 hours at 80°. The reaction mixture was cooled and filtered. The toluene filtrate was washed with water and dried over sodium sulfate and the solvent removed in vacuo. The residual oil crystallized on cooling. After recrystallization from a mixture of hexane and benzene 1:1, the material melted at 120°. Yield: 4.5 g.

Analysis (for $C_{17}H_{22}N_2O_7$ (MW 366.37)).—Calc'd: C, 55.73; H, 6.05; N, 7.65. Found: C, 55.85; H, 5.96; N. 7.58.

(b) *Desired compound.*—4.5 g. of ethyl N-(4,5-dimethoxy-2-nitrobenzoyl)-pipecolinate was dissolved in 250 ml. of ethanol and hydrogenated at room temperature at atmospheric pressure over Raney nickel. The catalyst was removed by filtration and the filtrate concentrated in vacuo. The residue of ethyl N-(4,5-dimethoxy-2-aminobenzoyl)pipercolinate was suspended in a mixture of 40 ml. of 3 N sodium hydroxide and 25 ml. of alcohol. The mixture was warmed on the steam bath for 5 minutes. The alcohol was concentrated in vacuo and to the residue was added 150 ml. of 3 N hydrochloric acid. The mixture was allowed to stand for 48 hours. The solution was alkalized with sodium carbonate solution and extracted with chloroform and dried over sodium sulfate. The solvent was removed in vacuo. The residue crystallized. After recrystallization from ethanol, the material melted at 255–256°. Yield: 1.2 g.

Analysis (for $C_{15}H_{18}N_2O_4$ (MW 290.29)).—Calc'd: C, 62.00; H, 6.20; N, 9.65. Found: C, 61.87; H, 5.95; N, 9.62.

EXAMPLE 17

*8-chloro-1,2,3,11,12,12a-hexahydro(4H,6H)pyrido-[1,2-c]-[1,4]benzodiazepine-6,12-dione*

(a) *Ethyl N-(2-amino-5-chlorobenzoyl)pipecolinate.*— 50 g. of 5-chloro anthranilic acid was suspended in 1.2 liter of dry benzene. To resulting solution was added 90 ml. of thionylchloride. The mixture was refluxed for 8 hours and concentrated to a syrupy residue in vacuo. The residue was taken up in 100 ml. of dry benzene and again concentrated to a syrup. It was dissolved in 600 ml. of toluene and 600 ml. of benzene and added to a mixture of 0.3 mole of ethyl pipecolinate and 0.6 mole of triethylamine in 100 ml. of benzene. The mixture was then refluxed for 8 hours. The reaction mixture was cooled and filtered. The toluene-benzene filtrate, dried over sodium sulfate, filtered and concentrated in vacuo. The residual oil crystallized out on cooling and gave 52 g. of the desired intermediate.

(b) *Desired final compound.*—52 g. of ethyl N-(2-amino-5-chlorobenzoyl)pipecolinate was suspended in 400 ml. of 3 N sodium hydroxide and 400 ml. of ethanol. The mixture was warmed on the steam bath for 8 minutes. The ethanol was concentrated in vacuo and to the residue was added 3 N hydrochloric acid until the solution was strongly acid. The mixture was allowed to stand over the weekend. The crystalline compound was filtered and washed with water. After recrystallization from methanol the material melted at 283–284°. Yield: 33 g.

Analysis (for $C_{13}H_{13}ClN_2O_2$ (MW 264.71)).—Calc'd: C, 58.98; H, 4.95; N, 10.59. Found: C, 58.96; H, 5.06; N, 10.41.

EXAMPLE 18

*8-iodo-1,2,3,11,12,12a-hexahydro(4H,6H)pyrido-[1,2-c]-[1,4]benzodiazepine-6,12-dione*

(a) *Ethyl N - (2 - amino - 5 - iodobenzoyl)pipecolinate.*—13.15 g. (0.05 mole) of 5-iodo anthranilic acid was dissolved in 600 ml. of benzene. To the resulting solution was added 15 ml. of thionyl chloride. The mixture was refluxed for 6 hours and concentrated to a syrupy residue in vacuo. The residue was taken up in 100 ml. of benzene and again concentrated to a syrup. It was dissolved in 400 cc. of toluene and added to a mixture of 0.05 mole of ethyl pipecolinate and 0.1 mole of triethylamine in 100 ml. of toluene at room temperature. The mixture was refluxed for 6 hours, then cooled and filtered. The toluene filtrate was washed with water and dried over sodium sulfate and the solvent removed in vacuo. The residual oil crystallized on cooling and gave 8 g. of the desired intermediate.

(b) *Desired compound.*—8 g. of ethyl N-(2-amino-5-iodobenzoyl)pipecolinate was suspended in 40 ml. of 3 N sodium hydroxide and 40 ml. of ethanol. The mixture was warmed on the steam bath for 5 minutes. The hydrochloric acid alcohol was removed in vacuo and to the residue was added 3 N hydrochloric acid until the solution was strongly acidic. The mixture was allowed to stand overnight. The crystalline compound was filtered and washed with water. After recrystallization from isopropanol the material melted at 236–237°. Yield: 5.5 g.

Analysis (for $C_{13}H_{13}IN_2O_2$ (MW 356.17)).—Calc'd: C, 43.84; H, 3.68; N, 7.89. Found: C, 43.55, H, 3.66; N, 7.97.

(III) 1,2,3,11,12,12a-HEXAHYDRO(4H,6H)PYRIDO[1,2-c][1,4]-BENZODIAZEPINES

EXAMPLE 19

*8-chloro-1,2,3,11,12,12a-hexahydro(4H,6H)pyrido[1,2-c]-[1,4]benzodiazepine*

0.7 g. of lithium aluminum hydride was suspended in 30 ml. of dry tetrahydrofuran. A solution of 2 g. of 8-chloro - 1,2,3,11,12,12a-hexahydro(4H,6H)pyrido[1,2-c][1,4]benzodiazepine-12-one in 100 ml. of tetrahydrofuran was added at room temperature while stirring. After addition was complete, the mixture was refluxed for 4 hours and excess lithium aluminum hydride destroyed by adding ethylacetate. The solvents were then removed in vacuo and the residue treated with a liberal amount of 3 N sodium hydroxide. This mixture was extracted with chloroform and the latter washed with water, dried over sodium sulfate and the solvent removed in vacuo. The residue crystallized spontaneously and was recrystallized from cyclohexane. Yield: 1.8 g.; M.P. 125–126°.

Analysis (for $C_{13}H_{17}ClN_2$ (MW 236.75).—Calc'd: C, 66.4; H, 7.24; Cl, 14.96; N, 11.82. Found: C, 66.09; H, 7.27; Cl, 14.73; N, 11.52.

EXAMPLE 20

*8-methyl-1,2,3,11,12,12a-hexahydro(4H,6H)pyrido[1,2-c]-[1,4]benzodiazepine*

10 g. of 8-methyl-1,2,3,11,12,12a-hexahydro(4H,6H) pyrido[1,2-c]-[1,4]benzodiazepine - 6,12 - dione was dissolved in 1200 ml. of tetrahydrofuran. To this solution was added portionwise 5 g. of lithium aluminum hydride. The obtained mixture was stirred and refluxed for 11 hours and concentrated in vacuo. The residue was cooled and hydrolyzed with 3 N sodium hydroxide. The solution was extracted with chloroform, washed with water and dried over sodium sulfate and filtered. After concentration in vacuo, the residue crystallized. Recrystallization from a mixture of pentane/hexane (1:1) afforded a substance having a M.P. of 119–120°. Yield: 8.7 g.

Analysis (for $C_{14}H_{20}N_2$ (MW 216.32)).—Calc'd: C, 77.73; H, 9.32; N, 12.95. Found: C, 77.80, H, 9.58, N, 12.67.

EXAMPLE 21

*9-methyl-1,2,3,11,12,12a-hexahydro(4H,6H)pyrido[1,2-c]-[1,4]benzodiazepine*

3.5 g. of 9-methyl-1,2,3,11,12,12a-hexahydro(4H,6H) pyrido[1,2-c]-[1,4]benzodiazepine-12-one was dissolved in 1000 ml. of tetrahydrofuran. To this solution was added portionwise 4 g. of lithium aluminum hydride. The obtained mixture was stirred and refluxed for 21 hours and concentrated in vacuo. The residue was cooled and hydrolyzed with 3 N sodium hydroxide. The solution was extracted with chloroform, washed with water and dried over sodium sulfate and filtered. After concentration in vacuo, the residue crystallized. Recrystallization from cyclohexane afforded a substance having a M.P. of 110°. Yield: 1.5 g.

Analysis (for $C_{14}H_{20}N_2$ (MW 216.32)).—Calc'd: C, 77.73; H, 9.32; N, 12.95. Found: C, 77.34; H, 9.47; N, 12.73.

EXAMPLE 22

*9-chloro-1,2,3,11,12,12a-hexahydro(4H,6H)pyrido[1,2-c]-[1,4]benzodiazepine*

5 g. of 9-chloro-1,2,3,11,12,12a-hexahydro(4H,6H) pyrido[1,2-c] - [1,4]benzodiazepine - 6,12 - dione was dissolved in 1000 ml. of tetrahydrofuran. To this solution was added portionwise 4 g. of lithium aluminum hydride. The obtained mixture was stirred and refluxed for 18 hours. The reaction mixture was cooled and excess lithium aluminum hydride was decomposed with ethyl acetate and the mixture concentrated in vacuo. The residue was cooled and hydrolyzed with 3 N sodium hydroxide. The solution was extracted with chloroform, washed with water and dried over sodium sulfate and filtered. After concentration in vacuo, the residue crystallized. Recrystallization from hexane afforded a substance having a M.P. of 131–132°. Yield 2.8 g.

Analysis (for $C_{13}H_{17}ClN_2$ (MW 236.74).—Calc'd: C, 65.92; H, 7.23; N, 11.83. Found: C, 66.08; H, 7.35; N, 11.62.

EXAMPLE 23

*9-methoxy-1,2,3,11,12,12a-hexahydro(4H,6H)pyrido[1,2-c]-[1,4]benzodiazepine*

5 g. of 9-methoxy-1,2,3,11,12,12a-hexahydro(4H,6H) pyrido[1,2-c]-[1,4]benzodiazepine-12-one was dissolved in 500 ml. of tetrahydrofuran. To this solution was added 2 g. of lithium aluminum hydride. The obtained mixture was stirred and refluxed for 20 hours. The excess of lithium aluminum hydride was decomposed with ethyl acetate and finally concentrated in vacuo. The residue was cooled and hydrolyzed with 3 N sodium hydroxide. The solution was extracted with chloroform, washed with water and dried over sodium sulfate and filtered. After concentration, the residue crystallized. Recrystallization from a mixture of petroleum ether and ether (1:1) afforded a substance of M.P. 104–105°. Yield: 4.1 g.

Analysis (for $C_{14}H_{20}N_2O$ (MW 232.33)).—Calc'd C, 72.40; H, 8.67; N, 12.06. Found: C, 72.15; H, 8.81; N, 12.19.

EXAMPLE 24

*8,9-dimethoxy-1,2,3,11,12,12a-hexahydro-(4H,6H) pyrido[1,2-c]-[1,4]benzodiazepine*

7 g. of 8,9-dimethoxy-1,2,3,11,12,12a-hexahydro-(4H, 6H)pyrido[1,2-c]-[1,4]benzodiazepine - 6,12 - dione was dissolved in 500 ml. of tetrahydrofuran. To this solution was added portionwise 3 g. of lithium aluminum hydride. The obtained mixture was stirred and refluxed for 8 hours, and concentrated in vacuo. The residue was cooled and hydrolyzed with 3 N sodium hydroxide. The solution was extracted with chloroform and the extract dried over sodium sulfate and filtered. After concentration in vacuo the residue crystallized. Recrystallization from petroleum ether afforded a substance having a M.P. of 116–117°. Yield: 2.5 g.

Analysis (for $C_{15}H_{22}N_2O_2$ (MW 262.35)).—Calc'd.: C, 68.67; H, 8.45; N, 10.68. Found: C, 68.37; H, 8.49; N, 10.71.

(IV) 11-[ω - HALO(LOWER)ALKANOYL] - 1,2,3,11,12,12a-HEXAHYDRO-(4H,6H)PYRIDO[1,2-c] - [1,4]BENZODIAZEPINES

EXAMPLE 25

*8-methyl - 11 - (3-chloropropionyl)-1,2,3,11,12,12a-hexahydro(4H,6H)pyrido[1,2-c]-[1,4]benzodiazepine*

4.2 g. of 8-methyl-1,2,3,11,12,12a-hexahydro(4H,6H)-pyrido[1,2-c]-[1,4]benzodiazepine was dissolved in 40 ml. of dry benzene and a solution of 4.8 g. of 3-chloropropionyl chloride in 10 ml. of benzene was added dropwise with cooling to the stirred solution. The resulting mixture was kept for 5 hours at 60°. The mixture was concentrated in vacuo, cooled, the residue dissolved in 15 ml. of water and alkalized with 3 N sodium hydroxide and extracted with chloroform, the extract was washed with water and dried over sodium sulfate and filtered. After removal of the solvent in vacuo the residue crystallized. Recrystallization from isopropanol afforded a substance having a M.P. of 99–100°. Yield: 3.5 g.

Analysis (for $C_{17}H_{23}ClN_2O$ (MW 306.82)).—Calc'd.: C, 66.56; H, 7.55; N, 9.12. Found: C, 66.78; H, 7.73; N, 9.18.

EXAMPLE 26

*8-chloro - 11 - (3-chloropropionyl)-1,2,3,11,12,12a-hexahydro(4H,6H)pyrido[1,2-c]-[1,4]benzodiazepine*

9 g. of 8-chloro-1,2,3,11,12,12a-hexahydro(4H,6H)-pyrido[1,2-c]-[1,4]benzodiazepine was dissolved in 150 ml. of dry benzene and a solution of 10.5 g. of 3-chloropropionyl chloride in 50 ml. of benzene was added dropwise at room temperature. The resulting mixture was refluxed for 3 hours. The mixture was concentrated in vacuo, the residue cooled and dissolved in 250 ml. of 1 N sodium hydroxide and extracted with chloroform, washed with water and dried over sodium sulfate and filtered. After concentration in vacuo, the residue crystallized. Recrystallization from pentane afforded a substance of M.P. 95–96°. Yield: 10 g.

Further illustrations of 11-[ω-halo(lower)alkanoyl] substituted pyridobenzodiazepines are given in Examples 30, 31 and 32.

(V) 11 - [ω-AMINO(LOWER)ALKANOYL] - 1,2,3,11,12,12a-HEXAHYDRO(4H,6H)PYRIDO[1,2-c] - [1,4]BENZODIAZEPINE

EXAMPLE 27

*8-methyl - 11 - (3-dimethylaminopropionyl)-1,2,3,11,12,-12a-hexahydro(4H,6H)pyrido[1,2-c] - [1,4]benzodiazepine*

3.06 g. (0.01 mole) of 8-methyl-11-(3-chloropropionyl) - 1,2,3,11,12,12a - hexahydro(4H,6H)pyrido[1,2-c]-[1,4]benzodiazepine was dissolved in 10 ml. of toluene, the solution placed in a pressure tube and to this solution was added 3 g. of dimethylamine. The tube was sealed and kept at 120° for 6 hours. The mixture was then cooled, the tube opened and its contents washed with bicarbonate solution. The toluene layer was dried over sodium sulfate, filtered and concentrated in vacuo. The residue crystallized. Recrystallization from petroleum/ether afforded the desired substance. Yield: 2.2 g.; M.P. 69–70.

Analysis (for $C_{19}H_{29}N_3O$ (MW 315.45)).—Calc'd.: C, 72.30; H, 9.27; N, 13.32. Found: C, 71.99; H, 9.46; N, 13.16.

EXAMPLE 28

*8-methyl - 11 - [3-(N-methylpiperazino)propionyl]-1,2,-3,11,12,12a-hexahydro(4H,6H)pyrido[1,2-c] - [1,4]benzodiazepine*

6 g. of 8-methyl-11-(3-chloropropionyl)-1,2,3,11,12,-12a-hexahydro(4H,6H)pyrido[1,2-c] - [1,4]benzodiazepine was dissolved in 150 ml. of dry toluene and a solution of 8 g. of N-methylpiperazine in 25 ml. of toluene was added dropwise with cooling to the stirred solution. The resulting mixture was stirred and refluxed for 6 hours. The mixture was concentrated in vacuo. The residue was cooled and alkalized with 1 N sodium hydroxide and extracted with chloroform. The chloroform solution was dried over sodium sulfate and concentrated in vacuo. The residue crystallized in the refrigerator. It melted at 64–65°. Yield: 2.5 g.

Analysis (for $C_{22}H_{34}N_4O$ (MW 370.52)).—Calc'd.: C, 71.25; H, 9.24; N, 15.12. Found: C, 70.81; H, 9.50; N, 15.42.

EXAMPLE 29

*8-methyl - 11 - (3-morpholinopropionyl)-1,2,3,11,12,12a-hexahydro(4H,6H)pyrido[1,2-c] - [1,4]benzodiazepine monohydrate*

3.06 g. (0.01 mole) of 8-methyl-11-(3-chloropropionyl) - 1,2,3,11,12,12a - hexahydro(4H,6H)pyrido[1,2-c]-[1,4]benzodiazepine was dissolved in 100 ml. of dry toluene. To this solution was added dropwise at room temperature a solution of 3.48 g. (0.04 mole) of morpholine in 25 ml. of toluene. The reaction mixture was stirred and refluxed for 8 hours. The mixture was concentrated in vacuo, cooled and alkalized with 3 N sodium hydroxide and extracted with chloroform, the latter washed with water and dried over sodium sulfate and filtered. The chloroform solution was concentrated in vacuo. The remaining oil was dissolved in 10 ml. of ethanol and the calculated amount of ethanolic hydrochloric acid was added. The mixture was concentrated until the residue crystallized. Recrystallization from ethanol and ether 1:2 afforded a very hygroscopic substance. Yield: 2.5 g.

Analysis (for $C_{21}H_{35}Cl_2N_3O_3$ (MW 448.42)).—Calc'd.: C, 56.22; H, 7.86; N, 9.36. Found: C, 55.92; H, 7.86; N, 9.17.

EXAMPLE 30

*9-chloro-11 - (3 - dimethylaminopropionyl) - 1,2,3,11,12, 12a - hexahydro(4H,6H)pyrido[1,2 - c] - [1,4]benzodiazepine*

4.5 g. of 9-chloro-11-(3-chloropropionyl)-1,2,3,11,12, 12a - hexahydro(4H,6H)pyrido[1,2-c] - [1,4]benzodiazepine, made in accordance with the procedure given in Example 25, was dissolved in 20 ml. of toluene in a pressure tube and to this mixture was added 3 g. of dimethylamine. The tube was sealed and heated at 105–110° for 6 hours. The mixture was cooled and washed with bicarbonate solution. The toluene layer was dried over sodium sulfate, filtered and concentrated in vacuo. The oily reaction product was then used to make the compound of Example 35.

EXAMPLE 31

*8,9 - dimethoxy - 11 - (3 - dimethylaminopropionyl) - 1, 2,3,11,12,12a - hexahydro(4H,6H)pyrido[1,2-c]-[1,4] benzodiazepine*

5.2 g. of 8,9 - dimethoxy - 1,2,3,11,12,12a-hexahydro-(4H,6H)pyrido[1,2 - c] - [1,4]benzodiazepine was dissolved in 50 ml. of dry benzene and a solution of 5 g. of 3-chloropropionyl chloride in 10 ml. of benzene was added dropwise with cooling to the stirred solution. The resulting mixture was kept for 4 hours at 60°. The mixture was concentrated in vacuo, the residue dissolved in 350 ml. of chloroform and washed with a solution of sodium bicarbonate. The chloroform solution was dried over sodium sulfate and filtered. After concentration in vacuo the remaining 8,9-dimethoxy-11-(3-chloropropionyl) - 1,2,3,11,12,12a-hexahydro(4H,6H)pyrido[1,2-c]-[1,4]benzodiazepine was dissolved in 10 ml. of toluene and transferred to a pressure tube and 3 g. of dimethylamine added. The tube was sealed and kept at 105–110° for 6 hours. The mixture was cooled, the tube opened and its contents washed with bicarbonate solution. The toluene layer was dried over sodium sulfate, filtered and concentrated in vacuo. The oily reaction product was used to make the compound of Example 36.

EXAMPLE 32

*9-chloro - 11 - (3-piperidinopropionyl)-1,2,3,11,12,12a-hexahydro(4H,6H)pyrido[1,2-c]-[1,4]benzodiazepine*

8 g. of 9-chloro-11-(3-chloropropionyl)-1,2,3,11,12,12a - hexahydro(4H,6H)pyrido[1,2 - c] - [1,4]benzodiazepine was dissolved in 200 ml. of dry benzene and to this mixture was added 5 g. of piperidine in 50 ml. of benzene. The reaction mixture was stirred and refluxed for 5 hours, and then concentrated in vacuo. The residue was suspended in 150 ml. of 1.5 N sodium hydroxide and extracted with chloroform; the chloroform-extract was dried over sodium sulfate, filtered and concentrated in vacuo. The residue was distilled to give 6 g. of a yellow oil; B.P. 209°/0.15 mm.

*Analysis* (for $C_{21}H_{30}ClN_3O$ (MW 375.92)).—Calc'd: C 67.11, H 8.04, N 11.18. Found: C 66.91, H 8.13, N 11.14.

EXAMPLE 33

*8-chloro-11-[3-piperidinopropionyl]1,2,3,11,12,12a-hexahydro(4H,6H)pyrido[1,2-c]-[1,4]benzodiazepine*

10 g. of 8-chloro-11-(3-chloropropionyl)-1,2,3,11,12, 12a - hexahydro(4H,6H)pyrido[1,2-c] - [1,4]benzodiazepine was dissolved in 200 ml. of dry benzene and to this mixture was added 6.8 g. of piperidine in 50 ml. of dry benzene. The reaction mixture was stirred and refluxed for 5 hours and then concentrated in vacuo. The residue was suspended in 100 ml. of 1.5 N sodium hydroxide and extracted with chloroform, dried over sodium sulfate, filtered and concentrated in vacuo. The residue crystallized upon cooling. Recrystallization from petroleum/ether afforded a substance of M.P. 99–100°. Yield: 6.2 g.

*Analysis* (for $C_{21}H_{30}ClN_3O$ (MW 375.92)).—Calc'd: C 67.11, H 8.04, N 11.18. Found: C 67.02, H 7.87, N 11.07.

(VI) 11-[ω-AMINO(LOWER)ALKYL]-1,2,3,11,12,12a-HEXAHYDRO-(4H,6H)PYRIDO[1,2-c]-[1,4]BENZODIAZEPINE

EXAMPLE 34

*8-methyl-11-(3-dimethylaminopropyl)-1,2,3,11,12,12a-hexahydro(4H,6H)pyrido[1,2-c]-[1,4]benzodiazepine*

6.2 g. of 8-methyl-11-(3-dimethylaminopropionyl)-1,2, 3,11,12,12a - hexahydro(4H,6H)pyrido[1,2-c]-[1,4]benzodiazepine was dissolved in 500 ml. of ether. To this mixture was added 2 g. of lithium aluminum hydride. The obtained mixture was stirred and refluxed for 20 hours. After decomposition of the excess of lithium aluminum hydride, the reaction mixture was concentrated in vacuo. The residue was cooled and hydrolyzed with 3 N sodium hydroxide.

The solution was extracted with chloroform, the latter washed with water and dried over sodium sulfate and filtered. After concentration in vacuo the residual oil was distilled to give 4.5 g. of a yellow oil; B.P. 157–158°/0.08 mm.

*Analysis* (for $C_{19}H_{31}N_3$ (MW 301.46)).—Calc'd: C 75.65, H 10.37, N 13.94. Found: C 75.36, H 10.74, N 13.73.

EXAMPLE 35

*9 - chloro - 11-(3-dimethylaminopropyl)-1,2,3,11,12,12a-hexahydro(4H,6H)pyrido[1,2-c]-[1,4]benzodiazepine*

4.4 g. of 9-chloro-11-(3-dimethylaminopropionyl)-1,2, 3,11,12,12a - hexahydro(4H,6H)pyrido[1,2-c]-[1,4]benzodiazepine was dissolved in 500 ml. of dry ether. To this solution was added 2.5 g. of lithium aluminum hydride. The obtained mixture was stirred and refluxed for 22 hours. After decomposition of excess lithium aluminum hydride the mixture was concentrated in vacuo. The residue was cooled and hydrolyzed with 3 N sodium hydroxide. The solution was extracted with chloroform, the latter washed with water and dried over sodium sulfate and filtered. After concentration in vacuo the residual-oil was distilled; B.P. 163–165°/0.03 mm. Yield: 2.5 g.

*Analysis* (for $C_{18}H_{28}ClN_3$ (MW 321.87)).—Calc'd: C 67.16, H 8.76, N 13.05. Found: C 67.05, H 8.92, N 12.91.

EXAMPLE 36

*8,9-dimethoxy-11-(3-dimethylaminopropyl) - 1,2,3,11,12, 12a - hexahydro(4H,6H)prido[12 - c] - [1,4]benzodiazepine*

3.5 g. of 8,9 - dimethoxy-11-(3-dimethylaminopropionyl)-1,2,3,11,12,12a-hexahydro(4H-6H)pyrido[1,2 - c]-[1,4]-benzodiazepine was dissolved in 500 ml. of dry ether. To this solution was added 3 g. of lithium aluminum hydride. The mixture obtained was stirred and refluxed for 20 hours. After decomposition of excess lithium aluminum hydride the reaction mixture was concentrated in vacuo. The residue was cooled and hydrolyzed with 3 N sodium hydroxide. This solution was extracted with chloroform, the latter washed with water and dried over sodium sulfate nad filtered. After concentration in vacuo the residual oil was distilled; B.P. 183–185°/0.05 mm. Yield 2.7 g.

*Analysis* (for $C_{20}H_{33}N_3O_2$ (MW 347.48)).—Calc'd: C, 69.09; H, 9.57; N, 12.09. Found: C, 68.70; H, 9.84; N, 11.95.

EXAMPLE 37

*9-chloro - 11 - (3 - piperidinopropyl) - 1,2,3,11-12,12a-hexahydro(4H,6H)pyrido[1,2-c]-[1,4]-benzodiazepine*

3 g. of 9-chloro-11-(3-piperidinopropionyl)-1,2,3,11, 12,12a-hexahydro(4H,6H)pyrido[1,2 - c] - [1,4 - benzodiazepin was dissolved in 350 ml. of dry ether. To this solution was added 2 g. of lithium aluminum hydride. The obtained mixture was stirred and refluxed for 18 hours. After decomposition of excess lithium aluminum hydride, the mixture was concentrated in vacuo. The residue was cooled and hydrolyzed with 3 N sodium hydroxide. The solution was extracted with chloroform, the latter washed with water and dried over sodium sulfate and filtered. After concentration in vacuo, the residual oil was distilled; M.P. 190–191°/0.1 mm. Yield: 2.1 g.

*Analysis* (for $C_{21}H_{31}N_3Cl$ (MW 361.95)).—Calc'd: C, 69.68; H, 8.91; N, 11.61. Found: C, 69.96; H, 8.85; N, 11.47.

What is claimed is:
1. A compound selected from among a pipecolinic acid derivative of the formula

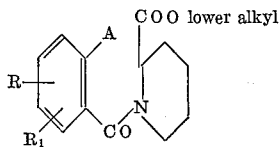

wherein R and $R_1$ are members selected from the group consisting of hydrogen, halogen, trifluoromethyl, cyano, lower alkyl, lower alkoxy and methylenedioxy, and
A is chosen from the group consisting of nitro and amino.

2. A compound as defined in claim 1 wherein said pipecolinic acid derivative is ethyl N-(5-methyl-2-nitrobenzoyl)pipecolinate.

3. A compound as defined in claim 1 wherein said pipecolinic acid derivative is ethyl N-(2-amino-5-methylbenzoyl)pipecolinate.

4. A compound as defined in claim 1 wherein said pipecolinic acid derivative is ethyl N-(4-chloro-2-nitrobenzoyl)pipecolinate.

5. A compound as defined in claim 1 wherein said pipecolinic acid derivative is ethyl N-(2-amino-4-chlorobenzoyl)pipecolinate.

6. A compound as defined in claim 1 wherein said pipecolinic acid derivative is ethyl N-(3-methoxy-2-nitrobenzoyl)pipecolinate.

7. A compound as defined in claim 1 wherein said pipecolinic acid derivative is ethyl N-(2-amino-3-methoxybenzoyl)pipecolinate.

8. A compound as defined in claim 1 wherein said pipecolinic acid derivative is ethyl N-(2-amino-3,5-dichlorobenzoyl)pipecolinate.

9. A compound as defined in claim 1 wherein said pipecolinic acid derivative is ethyl N-(4,5-dimethoxy-2-nitrobenzoyl)pipecolinate.

References Cited
UNITED STATES PATENTS

| | | | |
|---|---|---|---|
| 3,093,652 | 6/1963 | Elpern | 260—294.3 |
| 3,300,504 | 1/1967 | Doebel et al. | 260—294 |

OTHER REFERENCES

Beyerman Recueil, vol. 77, pp. 249–257 (1958).

WALTER A. MODANCE, *Primary Examiner.*
A. D. SPEVACK, *Assistant Examiner.*